US012559071B2

(12) United States Patent
Arikere et al.

(10) Patent No.: US 12,559,071 B2
(45) Date of Patent: Feb. 24, 2026

(54) INVERSE TYRE MODEL FOR ADVANCED VEHICLE MOTION MANAGEMENT

(71) Applicant: VOLVO TRUCK CORPORATION, Gothenburg (SE)

(72) Inventors: Adithya Arikere, Gothenburg (SE); Niklas Fröjd, Mölnlycke (SE); Leon Henderson, Härryda (SE); Sidhant Ray, Gothenburg (SE); Leo Laine, Härryda (SE); Mats Rydström, Billdal (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 95 days.

(21) Appl. No.: 17/450,523

(22) Filed: Oct. 11, 2021

(65) Prior Publication Data

US 2022/0126799 A1     Apr. 28, 2022

(30) Foreign Application Priority Data

Oct. 22, 2020     (EP) ..................................... 20203293

(51) Int. Cl.
B60T 8/172          (2006.01)
B60T 8/17          (2006.01)
(Continued)

(52) U.S. Cl.
CPC ............. B60T 8/172 (2013.01); B60T 8/1708 (2013.01); B60T 8/171 (2013.01); B60T 8/175 (2013.01);
(Continued)

(58) Field of Classification Search
CPC ........ B60T 8/172; B60T 8/1708; B60T 8/171; B60T 8/175; B60T 8/1761;
(Continued)

(56) References Cited

U.S. PATENT DOCUMENTS 5,269,391 A      12/1993  Ito et al.
6,378,960 B1 *    4/2002  Demmeler .............. B60T 8/321
                                   303/155
(Continued)

FOREIGN PATENT DOCUMENTS

CN         108394313 A       8/2018
CN         109606133 A       4/2019
(Continued)

OTHER PUBLICATIONS

European Search Report dated Mar. 22, 2021 in corresponding European Patent Application No. 20203293.4, 9 pages.
Tyre and vehicle dynamics, Elsevier Ltd. 2012, ISBN 978-0-08-097016-5, Hans Pacejka, 400 pages.

*Primary Examiner* — Andrew J Cromer
(74) *Attorney, Agent, or Firm* — Jeffri A. Kaminski; Venable LLP

(57)          ABSTRACT

A control unit (130, 140) for controlling a heavy duty vehicle (100),
    wherein the control unit is arranged to obtain input data indicative of a desired wheel force (Fx, Fy) to be generated by at least one wheel (210) of the vehicle (100), and
    to translate the input data into a respective equivalent wheel speed or wheel slip to be maintained by the wheel (210) to generate the desired wheel force (Fx, Fy) based on an inverse tyre model ($f^{-1}$) for the wheel (210),
    wherein the control unit (130, 140) is arranged to obtain the inverse tyre model in dependence of a current operating condition of the wheel (210), and
    wherein the control unit (130, 140) is arranged to control the heavy duty vehicle (100) based on the equivalent wheel speed or wheel slip.

19 Claims, 5 Drawing Sheets

(51) Int. Cl.

| | |
|---|---|
| *B60T 8/171* | (2006.01) |
| *B60T 8/175* | (2006.01) |
| *B60T 8/1761* | (2006.01) |
| *B60W 40/06* | (2012.01) |
| *B60W 40/101* | (2012.01) |

(52) U.S. Cl.
CPC ........ *B60T 8/1761* (2013.01); *B60T 8/17616* (2013.01); *B60W 40/06* (2013.01); *B60W 40/101* (2013.01); *B60T 2210/12* (2013.01); *B60T 2220/04* (2013.01); *B60T 2240/00* (2013.01); *B60T 2250/04* (2013.01); *B60T 2270/86* (2013.01); *B60W 2520/105* (2013.01); *B60W 2520/26* (2013.01)

(58) Field of Classification Search
CPC ............ B60T 8/17616; B60T 2210/12; B60T 2220/04; B60T 2240/00; B60T 2250/04; B60T 2270/86
See application file for complete search history.

(56) References Cited

U.S. PATENT DOCUMENTS

| | | | | |
|---|---|---|---|---|
| 8,983,749 | B1 | 3/2015 | Singh | |
| 9,475,500 | B2 | 10/2016 | Grimm et al. | |
| 2015/0175009 | A1* | 6/2015 | Beever | B60L 15/36 |
| | | | | 701/22 |
| 2016/0327451 | A1* | 11/2016 | Bauer | G01M 13/025 |
| 2017/0174192 | A1 | 6/2017 | Ying | |
| 2019/0176784 | A1* | 6/2019 | Laine | B60T 8/172 |
| 2019/0248370 | A1 | 8/2019 | Cunningham et al. | |

FOREIGN PATENT DOCUMENTS

| | | | |
|---|---|---|---|
| CN | 108422901 | B | 11/2019 |
| EP | 1840552 | A2 | 10/2007 |
| EP | 1719676 | B1 | 8/2015 |
| WO | 2014184344 | A1 | 11/2014 |
| WO | 2017215751 | A1 | 12/2017 |
| WO | 2019072379 | A1 | 4/2019 |

* cited by examiner

INVERSE TYRE MODEL FOR ADVANCED VEHICLE MOTION MANAGEMENT

TECHNICAL FIELD

The present disclosure relates to vehicle motion management for heavy duty vehicles, i.e., coordinated control of motion support devices such as service brakes and propulsion devices.

The invention can be applied in heavy-duty vehicles such as trucks, buses and construction machines. Although the invention will be described mainly with respect to cargo transport vehicles such as semi-trailer vehicles and trucks, the invention is not restricted to this particular type of vehicle but may also be used in other types of vehicles such as cars.

BACKGROUND

Vehicles are becoming ever more complex in terms of mechanics, pneumatics, hydraulics, electronics, and software. A modern heavy duty vehicle may comprise a wide range of different physical devices, such as combustion engines, electric machines, friction brakes, regenerative brakes, shock absorbers, air bellows, and power steering pumps. These physical devices are commonly known as Motion Support Devices (MSD). The MSDs may be individually controllable, for instance such that friction brakes may be applied at one wheel, i.e., a negative torque, while another wheel on the vehicle, perhaps even on the same wheel axle, is simultaneously used to generate a positive torque by means of an electric machine.

Recently proposed vehicle motion management (VMM) functionality executed, e.g., on a central vehicle unit computer (VUC) relies on combinations of the MSDs to operate the vehicle in order to obtain a desired motion effect while at the same time maintaining vehicle stability, cost efficiency and safety. WO2019072379 A1 discloses one such example where wheel brakes are used selectively to assist a turning operation by a heavy duty vehicle.

A commonly applied approach to controlling the various MSDs is to use torque control at the actuator level without any consideration towards wheel slip. However, this approach is not without performance limitations. For instance, in case an excessive wheel slip situation arises, where one or more wheels are slipping in an uncontrolled manner, then a safety function such as traction control and anti-lock brake functions steps in and requests a torque override in order to bring the slip back into control. These safety functions are normally operated by separate control units. If the primary control of the actuator and the slip control functions related to the actuator are allocated to different control units, then the latencies involved in the communication between them may limit the slip control performance. Moreover, the related actuator and slip assumptions made in the plurality of control units which are used to achieve slip control can be inconsistent and this in turn can lead to sub-optimal performance.

There is a need for improved vehicle control methods which handle wheel slip in a better way.

SUMMARY

It is an object of the present disclosure to provide control units and methods which facilitate vehicle control based on slip or wheel speed requests instead of the customary torque requests, which speed or slip requests are obtained based on improved tyre behavioral models. This object is at least in part obtained by a control unit for controlling a heavy duty vehicle. The control unit is arranged to obtain input data indicative of a desired wheel force to be generated by at least one wheel of the vehicle, and to translate the input data into a respective equivalent wheel speed or wheel slip to be maintained by the wheel in order to generate the desired wheel force based on an inverse tyre model for the wheel. The control unit is arranged to obtain the inverse tyre model in dependence of a current operating condition of the wheel, and to control the heavy duty vehicle based on the equivalent wheel speed or wheel slip.

Thus, instead of requesting torques from the different actuators as is customary, wheel slip requests are sent to the wheel torque actuators at wheel end, which are then tasked with maintaining operation at the requested wheel slip. This way the control of the MSDs is moved closer to wheel end, where a higher bandwidth control is possible due to the reduced control loop latencies and faster processing which is often available closer to wheel end. The MSDs are thereby able to react much more quickly to changes in, e.g., road friction, and thus provide a more stable wheel force despite variable operating conditions. Compared to legacy torque-based control, this approach to MSD control improves both startability of heavy duty vehicles, and also maneuvering in higher speed driving scenarios. For instance, if a wheel temporarily leaves the ground or experiences significantly reduced vertical force due to a bump in the road, the wheel will not spin out of control. Rather, the MSD control will quickly reduce applied torque to maintain wheel slip at the requested value, such that when the wheel again touches ground, the proper wheel speed will be maintained.

It is a further advantage that the inverse tyre model is adjusted to account for variations in the current operating conditions of the wheel, since this improves the accuracy and robustness of the mapping between desired wheel force and equivalent wheel speed or wheel slip. This way, when operating conditions change, the inverse tyre model will be adjusted to better model the current operating conditions. Thus, as the operating conditions change for a given wheel, the mapping between wheel force and wheel slip (or wheel speed) also changes to compensate for the change in operating condition.

The control unit may also be arranged to allocate, i.e., request, a steering angle to be maintained at one or more steered wheels on the vehicle in addition to wheel slip or wheel speed. This steering angle will have an effect on wheel lateral slip. It is therefore often an advantage to treat steering and wheel torque (slip or speed) jointly, since this often improves overall vehicle control in terms of both robustness and efficiency.

According to aspects, the data indicative of the desired wheel force comprises a desired wheel torque and a wheel rolling radius. This means that the inverse tyre model interface can accommodate a function which outputs requested torque, such as a legacy vehicle control function, which together with wheel radius represents or is indicative of a desired wheel force.

According to aspects, the current operating condition comprises a vehicle or wheel speed over ground vector. Knowing wheel speed over ground, it becomes possible to control wheel rotational velocity to maintain wheel slip at a desired level. The wheel speed over ground can also have an effect on the mapping between wheel force and wheel slip. For instance, the contact patch between ground and the wheel may change in dependence of vehicle speed.

According to aspects, the current operating condition comprises a normal load of the wheel or a vertical force acting on the wheel. The normal load of a given wheel, together with friction coefficient, determines the maximum achievable wheel force. Thus, the inverse tyre model is preferably adjusted to account for variation in normal load. By measuring or otherwise determining normal load, the inverse tyre model can be made more accurate.

According to aspects, the current operating condition comprises an estimated or otherwise determined tyre stiffness of the wheel. The tyre stiffness has a large impact on the inverse tyre model in a linear region from low to medium wheel slips. By accounting for changes in tyre stiffness, a more accurate inverse tyre model can be obtained. The tyre stiffness is optionally corrected for factors related to the tyre on a given wheel, such as wear, age, temperature, inflation pressure, etc. The tyre stiffness can either be only the longitudinal slip stiffness which can be used as a basis to scale the lateral slip stiffness or a vector comprising both the longitudinal and the lateral slip stiffness.

According to aspects, the current operating condition comprises a tyre road friction coefficient associated with the wheel. The tyre road friction coefficient also has an impact on the mapping between wheel force and wheel slip, among other things since it has an impact on the maximum achievable tyre force. An estimated road friction parameter can be used to adapt the tyre force curve to limit the peak force allowed and also to change the peak force slip position of the inverse tyre model.

According to aspects, the current operating condition comprises a minimum required lateral force of the wheel. This means that it becomes possible to require operation with a minimum lateral force generation capability of a given wheel. For instance, if the vehicle is turning, a certain amount of lateral force may need to be generated in order to successfully complete the turn. With a requirement on lateral force, the wheel speed may need to be limited to wheel slips below the requested wheel slip. Similarly, the current operating condition optionally comprises a maximum allowed lateral slip angle of the wheel. With minimum required lateral force and maximum allowed lateral slip angle, the longitudinal slip request generated is limited to a search space where a minimum lateral force capacity is guaranteed using a maximum allowed lateral slip angle. Although both are optional arguments, they can be advantageously used to request longitudinal force in a safe manner that does not cause issues with, e.g., yaw instability and the like. The minimum required lateral force parameter can be used by a vehicle controller to ensure that enough lateral force capacity remains to be able to negotiate a given path having a certain acceleration profile and a curvature profile. The maximum longitudinal velocity of a vehicle throughout a maneuver is normally limited by roll stability and road friction. To know what range of lateral accelerations that can be supported by a vehicle unit negotiating a turning maneuver, the lateral force capability may be necessary to know. Thus, being able to specify a minimum required lateral force capability is an advantage.

The maximum allowed lateral slip angle can be used by the vehicle controller to ensure that the yaw moment balance or the side-slip of the vehicle is maintained at acceptable levels in agreement with the maneuver to be executed. This feature can be of particular benefit in autonomous or functional safety critical applications where it is desired to keep the tyres operating in their linear combined-slip range and therefore preventing any traction control or yaw stability interventions which may cause effects that are difficult to predict.

According to aspects, the inverse tyre model is configured to provide a remaining lateral force capacity of the wheel. The remaining lateral force capacity can be used to adjust bounds on the requests being sent to wheel end or as feedback to a control allocator to adapt its control requests to increase lateral force capacity of the wheel if it becomes too low for the current driving scenario.

According to aspects, the inverse tyre model is configured to provide a gradient of the desired wheel force with respect to wheel speed or wheel slip at a tyre operating point associated with the desired wheel force and the current operating condition of the wheel. This output can be used to, e.g., custom tune the gains to the speed controller in the actuator depending on the priority of the control allocator. For instance, if the vehicle is cornering and the lateral gradient value is high, it indicates that poor speed control performance can degrade the lateral cornering performance and hence the gains for the speed controller can be adapted to mitigate this problem. Knowing the gradients can also help in performing analysis on stability and control robustness, which is an advantage.

According to aspects, the control unit is arranged to store a pre-determined inverse tyre model in memory, wherein the inverse tyre model is stored in the memory as a function of the current operating condition of the wheel. This means that the control unit has access to a range of different models, and it can select a suitable model from the range of models.

According to aspects, the control unit is arranged to adapt the inverse tyre model based on a measured wheel behavior and/or vehicle behavior in response to the control of the heavy duty vehicle based on the equivalent wheel speed or wheel slip. Thus, advantageously, the control unit monitors the actual response by the wheel, and possibly also by the vehicle, and adjusts the inverse tyre model accordingly. This means that the control method becomes less sensitive to assumptions made on the performance of the vehicle in different scenarios or the impact of different parameters on the controllability of the vehicle. Also, if the operating conditions change in an unexpected manner, the inverse tyre model will adapt to the change, thereby providing robust control also in scenarios which have not yet been encountered.

According to aspects, the inverse tyre model is adjusted to always lie within pre-determined upper and/or lower limits on wheel force in dependence of wheel slip or wheel speed. This means that model adjustment of the inverse tyre model is allowed, but only within some predetermined boundaries. The boundary or boundaries therefore represent a safe-guard against unforeseen error in the model adaptation process. One example of an adaptive inverse tyre model is an artificial neural network which is continuously or at least regularly trained based on control input and actual wheel response or vehicle response to the control input.

There is also disclosed herein computer programs, computer readable media, computer program products, and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
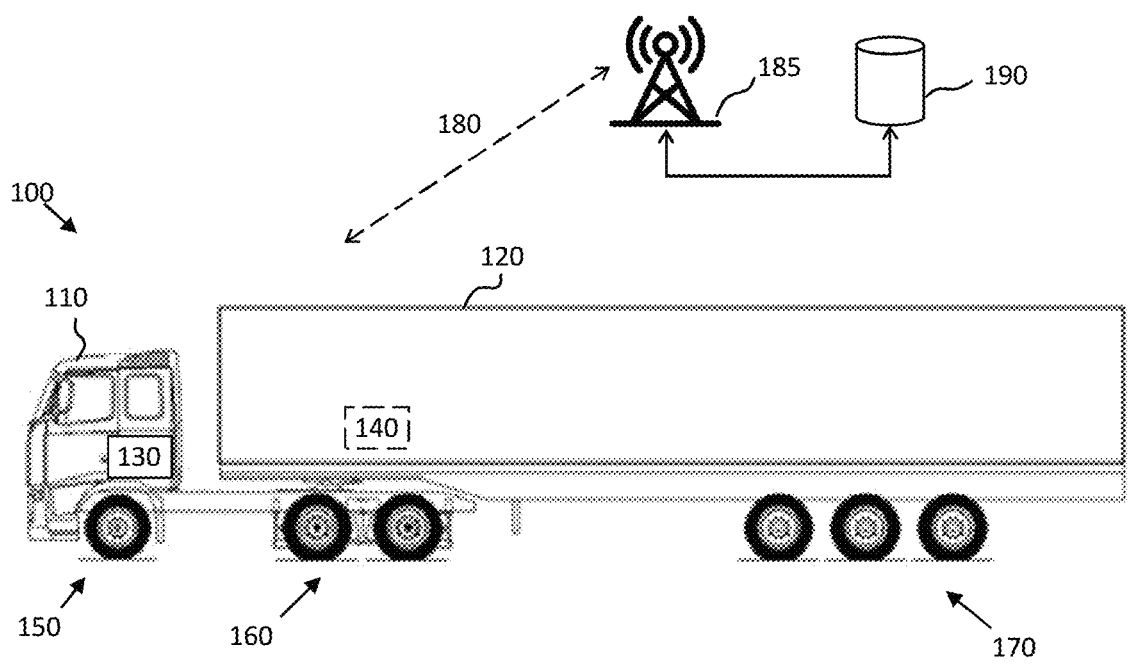
FIG. 1 shows an example heavy duty vehicle.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 illustrates an example vehicle 100 for cargo transport where the herein disclosed techniques can be applied with advantage. The vehicle 100 comprises a tractor or towing vehicle 110 supported on front wheels 150 and rear wheels 160, at least some of which are driven wheels. Normally but not necessarily, all the wheels on the tractor are braked wheels. The tractor 110 is configured to tow a first trailer unit 120 supported on trailer wheels 170 by a fifth wheel connection in a known manner. The trailer wheels are normally braked wheels but may also comprise driven wheels on one or more axles.

It is appreciated that the herein disclosed methods and control units can be applied with advantage also in other types of heavy duty vehicles, such as trucks with drawbar connections, construction equipment, buses, and the like.

The tractor 110 comprises a vehicle unit computer (VUC) 130 for controlling various kinds of functionality, i.a. to achieve propulsion, braking, and steering. Some trailer units 120 also comprise a VUC 140 for controlling various functions of the trailer, such as braking of trailer wheels, and sometimes also trailer wheel propulsion. The VUCs 130, 140 may be centralized or distributed over several processing circuits. Parts of the vehicle control functions may also be executed remotely, e.g., on a remote server 190 connected to the vehicle 100 via wireless link 180 and a wireless access network 185.

The VUC 130 on the tractor 110 (and possibly also the VUC 140 on the trailer 120) may be configured to execute vehicle control methods which are organized according to a layered functional architecture where some functionality may be comprised in a traffic situation management (TSM) domain in a higher layer and some other functionality may be comprised in a vehicle motion management (VMM) domain residing in a lower functional layer.

Figure 2:
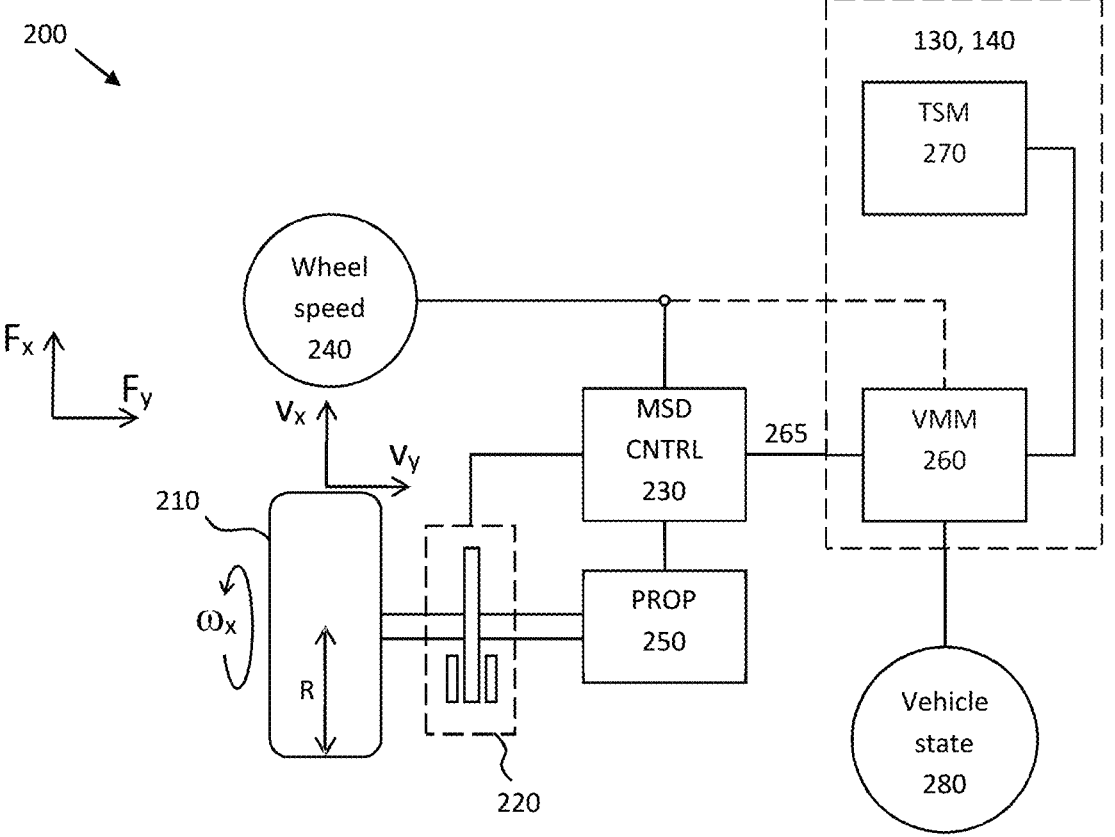
FIG. 2 schematically illustrates a motion support device arrangement.

FIG. 2 schematically illustrates functionality 200 for controlling a wheel 210 by some example MSDs here comprising a friction brake 220 (such as a disc brake or a drum brake) and a propulsion device 250. The friction brake 220 and the propulsion device are examples of wheel torque generating devices, which may also be referred to as actuators and which can be controlled by one or more motion support device control units 230. The control is based on, e.g., measurement data obtained from a wheel speed sensor 240 and from other vehicle state sensors 280, such as radar sensors, lidar sensors, and also vision based sensors such as camera sensors and infra-red detectors. Other example torque generating motion support devices which may be controlled according to the principles discussed herein comprise engine retarders and power steering devices. An MSD control unit 230 may be arranged to control one or more actuators. For instance, it is not uncommon that an MSD control unit 230 is arranged to control both wheels on an axle.

The TSM function 270 plans driving operation with a time horizon of, e.g., 10 seconds or so. This time frame corresponds to, e.g., the time it takes for the vehicle 100 to negotiate a curve. The vehicle maneuvers, planned and executed by the TSM, can be associated with acceleration profiles and curvature profiles which describe a desired vehicle velocity and turning for a given maneuver. The TSM continuously requests the desired acceleration profiles $a_{req}$ and curvature profiles $c_{req}$ from the VMM function 260 which performs force allocation to meet the requests from the TSM in a safe and robust manner. The VMM function 260 continuously feeds back capability information to the TSM function detailing the current capability of the vehicle in terms of, e.g., forces, maximum velocities, and accelerations which can be generated.

Acceleration profiles and curvature profiles may also be obtained from a driver of the heavy duty vehicle via normal control input devices such as a steering wheel, accelerator pedal and brake pedal. The source of said acceleration profiles and curvature profiles is not within scope of the present disclosure and will therefore not be discussed in more detail herein.

Figure 3:
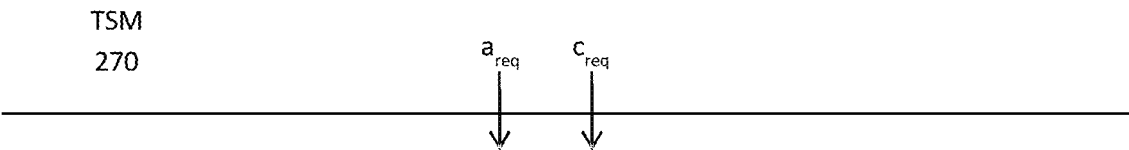
FIG. 3 illustrates vehicle control functions.
Figure 3:
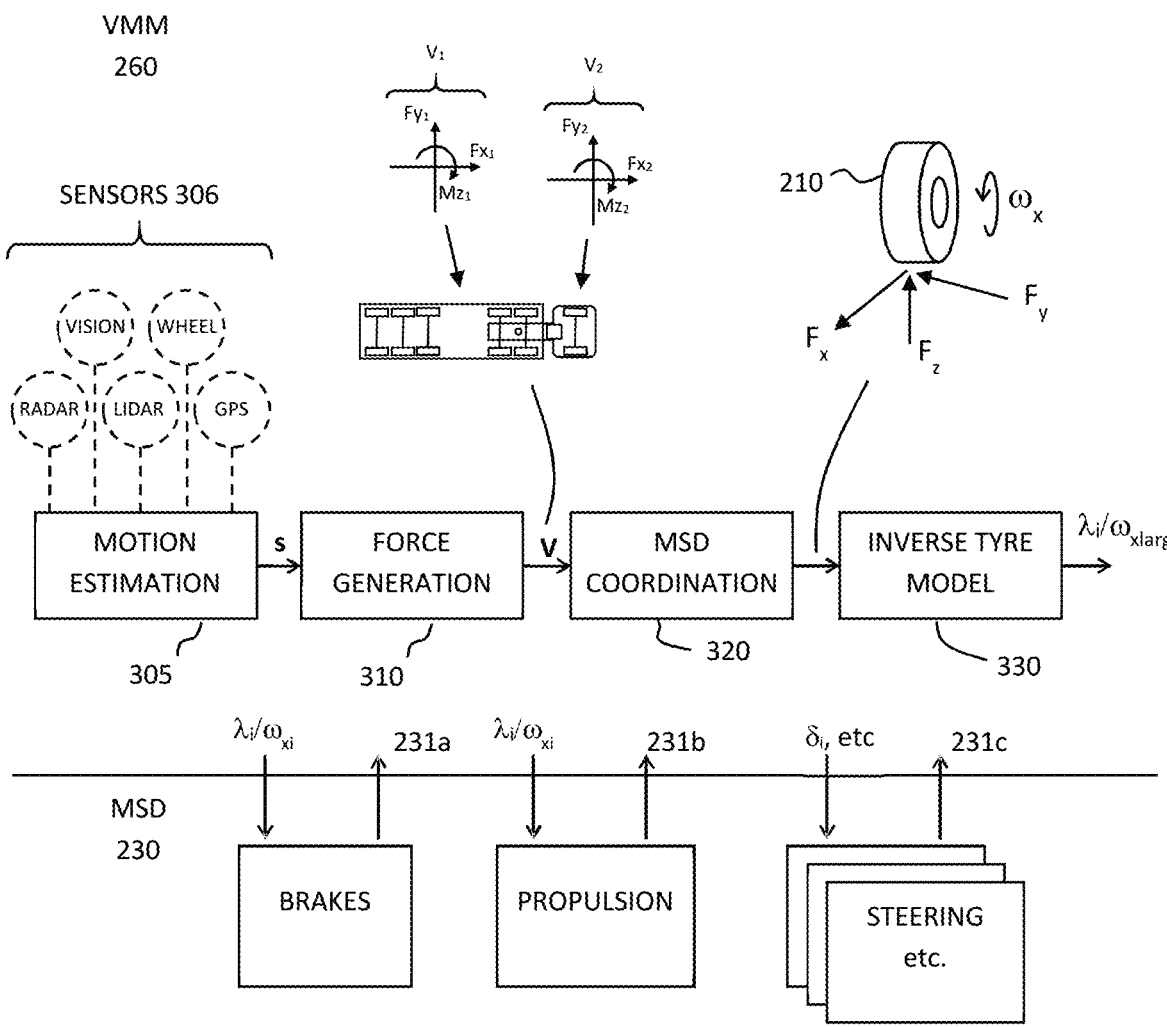

With reference also to FIG. 3, the VMM function 260 operates with a time horizon of about 1 second or so, and continuously transforms the acceleration profiles $a_{req}$ and curvature profiles $c_{req}$ into control commands for controlling vehicle motion functions, actuated by the different MSDs 220, 250 of the vehicle 100 which report back capabilities to the VMM, which in turn are used as constraints in the vehicle control. The VMM function 260 performs vehicle state or motion estimation 305, i.e., the VMM function 260 continuously determines a vehicle state s comprising positions, speeds, accelerations and articulation angles of the different units in the vehicle combination by monitoring operations using various sensors 306 arranged on the vehicle 100, often but not always in connection to the MSDs 220, 250.

The result of the motion estimation 305, i.e., the estimated vehicle state s, is input to a force generation module 310 which determines the required global forces $V=[V_1, V_2]$ for the different vehicle units to cause the vehicle 100 to move according to the requested acceleration and curvature profiles $a_{req}$, $c_{req}$. The required global force vector V is input to an MSD coordination function 320 which allocates wheel forces and coordinates other MSDs such as steering and suspension. The coordinated MSDs then together provide the desired lateral Fy and longitudinal Fx forces on the vehicle units, as well as the required moments Mz, to obtain the desired motion by the vehicle combination 100.

By determining vehicle unit motion using, e.g., global positioning systems, vision-based sensors, wheel speed sensors, radar sensors and/or lidar sensors, and translating this vehicle unit motion into a local coordinate system of a given wheel 210 (in terms of, e.g., longitudinal and lateral velocity components), it becomes possible to accurately estimate wheel slip in real time by comparing the vehicle unit motion in the wheel reference coordinate system to data obtained from the wheel speed sensor 240 arranged in connection to the wheel 210.

A tyre model, which will be discussed in more detail in connection to FIG. 4 below, can be used to translate between a desired longitudinal tyre force $Fx_i$ for a given wheel i and an equivalent wheel slip $\lambda_i$ for the wheel. Wheel slip $\lambda$ relates to a difference between wheel rotational velocity and speed over ground and will be discussed in more detail below. Wheel speed co is a rotational speed of the wheel, given in units of, e.g., rotations per minute (rpm) or angular velocity in terms radians/second (rad/sec) or degrees/second (deg/sec).

Herein, a tyre model is a model of wheel behavior which describes wheel force generated in longitudinal direction (in the rolling direction) and/or lateral direction (orthogonal to the longitudinal direction) as function of wheel slip. In "Tyre and vehicle dynamics", Elsevier Ltd. 2012, ISBN 978-0-08-097016-5, Hans Pacejka covers the fundamentals of tyre models. See, e.g., chapter 7 where the relationship between wheel slip and longitudinal force is discussed.

To summarize, the VMM function 260 manages both force generation and MSD coordination, i.e., it determines what forces that are required at the vehicle units in order to fulfil the requests from the TSM function 270, for instance to accelerate the vehicle according to a requested acceleration profile requested by TSM and/or to generate a certain curvature motion by the vehicle also requested by TSM. The forces may comprise e.g., yaw moments Mz, longitudinal forces Fx and lateral forces Fy, as well as different types of torques to be applied at different wheels.

The interface 265 between VMM and MSDs capable of delivering torque to the vehicle's wheels has, traditionally, been focused on torque based requests to each MSD from the VMM without any consideration towards wheel slip. However, this approach has significant performance limitations. In case a safety critical or excessive slip situation arises, then a relevant safety function (traction control, anti-lock brakes, etc.) operated on a separate control unit normally steps in and requests a torque override in order to bring the slip back into control. The problem with this approach is that since the primary control of the actuator and the slip control of the actuator are allocated to different electronic control units (ECUs), the latencies involved in the communication between them significantly limits the slip control performance. Moreover, the related actuator and slip assumptions made in the two ECUs that are used to achieve the actual slip control can be inconsistent and this in turn can lead to sub-optimal performance.

Significant benefits can be achieved by instead using a wheel speed or wheel slip based request on the interface 265 between VMM and the MSD controller or controllers 230, thereby shifting the difficult actuator speed control loop to the MSD controllers, which generally operate with a much shorter sample time compared to that of the VMM function. Such an architecture can provide much better disturbance rejection compared to a torque based control interface and thus improves the predictability of the forces generated at the tyre road contact patch.

With reference to FIG. 3, the inverse tyre model block 330 translates the required wheel forces $Fx_i$, $Fy_i$ determined for each wheel, or for a subset of wheels, by the MSD coordination block 320 into equivalent wheel speeds $\omega_{wi}$ or wheel slips $\lambda_i$. These wheel speeds or slips are then sent to the respective MSD controllers 230. The MSD controllers report back capabilities 231a-231c which can be used as constraints in, e.g., the MSD coordination block 320.

Longitudinal wheel slip $\lambda$ may, in accordance with SAE J670 (SAE Vehicle Dynamics Standards Committee Jan. 24, 2008) be defined as $$\lambda = \frac{R\omega_x - v_x}{\max(|R\omega|, |v_x|)}$$

where R is an effective wheel radius in meters, $\omega_x$ is the angular velocity of the wheel, and $v_x$ is the longitudinal speed of the wheel (in the coordinate system of the wheel). Thus, $\lambda$ is bounded between –1 and 1 and quantifies how much the wheel is slipping with respect to the road surface. Wheel slip is, in essence, a speed difference measured between the wheel and the vehicle. Thus, the herein disclosed techniques can be adapted for use with any type of wheel slip definition. It is also appreciated that a wheel slip value is equivalent to a wheel speed value given a velocity of the wheel over the surface, in the coordinate system of the wheel.

The VMM 260 and optionally also the MSD control unit 230 maintains information on $v_x$ (in the reference frame of the wheel), while a wheel speed sensor 240 or the like can be used to determine $\omega_x$ (the rotational velocity of the wheel).

In order for a wheel (or tyre) to produce a wheel force, slip must occur. For smaller slip values the relationship between slip and generated force are approximately linear, where the proportionality constant is often denoted as the slip stiffness of the tyre. A tyre 210 is subject to a longitudinal force $F_x$, a lateral force $F_y$, and a normal force $F_z$. The normal force $F_z$ is key to determining some important vehicle properties. For instance, the normal force to a large extent determines the achievable lateral tyre force $F_y$ by the wheel since, normally, $F_y \leq \mu F_z$, where $\mu$ is a friction coefficient associated with a road friction condition. The maximum available lateral force for a given lateral slip can be described by the so-called Magic Formula as described in "Tyre and vehicle dynamics", Elsevier Ltd. 2012, ISBN 978-0-08-097016-5, by Hans Pacejka.

Figure 4:
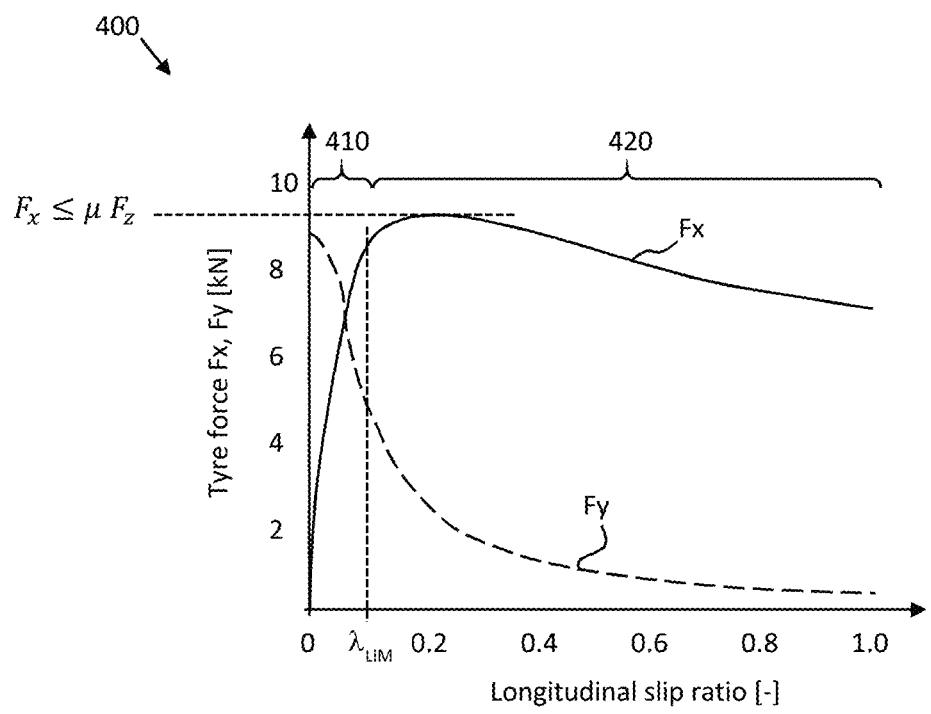
FIG. 4 is a graph showing tyre force as function of wheel slip.

FIG. 4 is a graph showing an example of achievable tyre force as function of wheel slip. The longitudinal tyre force Fx shows an almost linearly increasing part 410 for small wheel slips, followed by a part 420 with more non-linear behaviour for larger wheel slips. The obtainable lateral tyre force Fy decreases rapidly even at relatively small longitudinal wheel slips. It is desirable to maintain vehicle operation in the linear region 410, where the obtainable longitudinal force in response to an applied brake command is easier to predict, and where enough lateral tyre force can be generated if needed. To ensure operation in this region, a wheel slip limit $\lambda_{LIM}$ on the order of, e.g., 0.1, can be imposed on a given wheel. For larger wheel slips, e.g., exceeding 0.1, a more non-linear region 420 is seen. Control of a vehicle in this region may be difficult and is therefore often avoided. It may be interesting for traction in off-road conditions and the like where a larger slip limit for traction control might be preferred, but not for on-road operation.

This type of tyre model can be used by the VMM 260 to generate a desired tyre force at some wheel. Instead of requesting a torque corresponding to the desired tyre force, the VMM can translate the desired tyre force into an equivalent wheel slip (or, equivalently, a wheel speed relative to a speed over ground) and request this slip instead. The main advantage being that the MSD control device 230 will be able to deliver the requested torque with much higher bandwidth by maintaining operation at the desired wheel slip, using the vehicle speed $v_x$ and the wheel rotational velocity $\omega_x$.

The control unit 130, 140 can be arranged to store a pre-determined inverse tyre model $f^{-1}$ in memory, e.g., as a look-up table. The inverse tyre model is arranged to be stored in the memory as a function of the current operating condition of the wheel 210. This means that the behavior of the inverse tyre model is adjusted in dependence of the operating condition of the vehicle, which means that a more accurate model is obtained compared to one which does not account for operating condition. The model which is stored in memory can be determined based on experiments and trials, or based on analytical derivation, or a combination of the two. For instance, the control unit can be configured to access a set of different models which are selected depending on the current operating conditions. One inverse tyre model can be tailored for high load driving, where normal forces are large, another inverse tyre model can be tailored for slippery road conditions where road friction is low, and so on. The selection of a model to use can be based on a pre-determined set of selection rules. The model stored in memory can also, at least partly, be a function of operating condition. Thus, the model may be configured to take, e.g., normal force or road friction as input parameters, thereby obtaining the inverse tyre model in dependence of a current operating condition of the wheel 210. It is appreciated that many aspects of the operating conditions can be approximated by default operating condition parameters, while other aspects of the operating conditions can be roughly classified into a smaller number of classes. Thus, obtaining the inverse tyre model in dependence of a current operating condition of the wheel 210 does not necessarily mean that a large number of different models need to be stored, or a complicated analytical function which is able to account for variation in operating condition with fine granularity. Rather, it may be enough with two or three different models which are selected depending on operating condition. For instance, one model to be used when the vehicle is heavily loaded and another model to be used otherwise. In all cases, the mapping between tyre force and wheel slip changes in some way in dependence of the operating condition, which improves the precision of the mapping.

The inverse tyre model may also be implemented at least partly as an adaptive model configured to automatically or at least semi-automatically adapt to the current operating conditions of the vehicle. This can be achieved by constantly monitoring the response of a given wheel in terms of wheel force generated in response to a given wheel slip request, and/or monitoring the response of the vehicle 100 in response to the wheel slip requests. The adaptive model can then be adjusted to more accurately model the wheel forces obtained in response to a given wheel slip request from a wheel.

Figure 5:
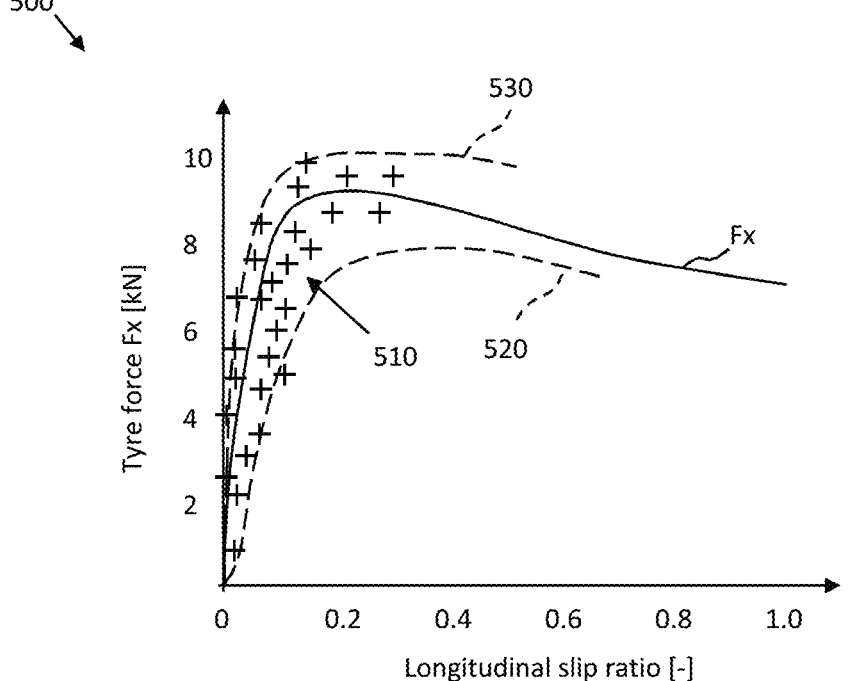
FIG. 5 illustrates adaptation of a wheel behavioral model to measurement data.

FIG. 5 is a graph 500 illustrating an inverse tyre model which maps longitudinal tyre force Fx to wheel slip. Measurements 510 of pairs (F, $\lambda$) of wheel slip with corresponding tyre force F are also plotted. According to some aspects, the control units disclosed herein are arranged to adapt the inverse tyre model $f^{-1}$ based on a measured wheel behavior and/or vehicle behavior in response to the control of the heavy duty vehicle 100 based on the equivalent wheel speed or wheel slip. One such type of measurement is the resistance encountered by an electric machine when trying to generate a particular wheel speed. This "torque status" output signal of the electric machine can be directly translated into an equivalent wheel force via the effective wheel radius R. The wheel force samples can also be obtained from the VMM function as part of the force allocation process. For instance, if the VMM notes that a too small longitudinal force is consistently obtained in response to a given requested wheel slip, then the model can be adjusted to account for the discrepancy, e.g., by scaling it to better match the desired wheel forces. In this context, it is noted that the inverse tyre model need not be correct in an absolute frame of reference, i.e., that the inverse tyre model is able to exactly predict the generated force in Newton for a given wheel slip. Rather, it is enough if the inverse tyre model is such as to allow successful control of the vehicle by the VMM function 260. Interestingly, by adjusting the inverse tyre model in this manner based on measured wheel force in response to wheel slip requests, other characteristics of the vehicle will automatically be included in the modelling to more accurately represent the mapping between wheel slip and wheel force.

In a first example of the adaptation of the inverse tyre model, sample pairs (F, $\lambda$) of generated force F vs current wheel slip $\lambda$ are continuously obtained. Generated force F (both longitudinal Fx and lateral Fy) as well as yaw moments Mz can be determined based on vehicle behavior, i.e., Newtons second law type of relationships, where both mass m and accelerations a are possible to measure using basic sensor technology together with current wheel slip.

The inverse tyre model is then continuously updated to fit the current measurement results. For instance, a Kalman filter can be applied to track coefficients $\{c_i\}$ of a polynomial model which can then be used as inverse tyre model. A polynomial fit can also be made to fit measurement data 510 to a model, which model can then be used as the inverse tyre model.

In a second example a neural network or other form of AI-based method is applied to continuously update the inverse tyre model. The network is trained, e.g., using sample pairs (F,$\lambda$) of generated force F vs current wheel slip $\lambda$. Input to the network can be, e.g., vehicle load, tyre specification, and road condition in terms of, e.g., friction. The output can be a set of coefficients for a polynomial model which can be used as a representation of the inverse tyre model.

It is appreciated that this model adaptation does not need to be performed on-board the vehicle 100. Rather, measurement data can be uploaded to the remote server 190 which can be tasked with finding a suitable model for controlling the vehicle based on wheel slip instead of based on torque request. This model can then account for measurement data from more than one vehicle, perhaps from a set of vehicles of the same type, or operational design domain. The model or sets of models can then be fed back from the remote server 190 to the vehicle to be used in control of the vehicle 100.

The whole inverse tyre model can of course also be realized as a neural network which is trained during different types of operating conditions. Then, as the operating conditions of the heavy duty vehicle changes, the inverse tyre model also changes such that the corresponding wheel slip for a given wheel force changes over time, which is an advantage.

The inverse tyre model $f^{-1}$ can also be adjusted to always lie within pre-determined upper and lower limits on wheel force in dependence of wheel slip or wheel speed. These limits may, e.g., be obtained as statistical limits derived from the measurement data 510. For instance, the upper and lower limits 520, 530 may be set so as to limit the inverse tyre model within one or two stand deviations from the mean, or the like.

Safety margins can also be applied to the adaptation itself, i.e., a constrained adaptation can be performed where the inverse tyre model is not permitted to deviate outside of a fenced region around some nominal model curve. This fenced region can be pre-determined or adjusted in accordance with operating condition, or by pre-defined dynamic driving tasks (DDTs) on known operational design domains (ODDs) which will reduce the required amount of verification and validation.

With reference again to FIG. 2, the MSD control unit 230 can be configured to control one or more MSDs associated with the wheel 210. The one or more MSDs may comprise at least one service brake 220 arranged to generate negative torque by the wheel 210, as well as propulsion units 250 arranged to generate a positive and/or a negative torque by the wheel 210, such as electric machines and/or a combustion engine. Other torque generating devices which may be controlled by an MSD control unit comprises engine retarders and power steering devices. The MSD control unit 230 is communicatively coupled to the VMM unit 260 for receiving control commands from the VMM unit 260 comprising wheel speed and/or wheel slip requests to control vehicle motion by the one or more MSDs.

Figure 6:
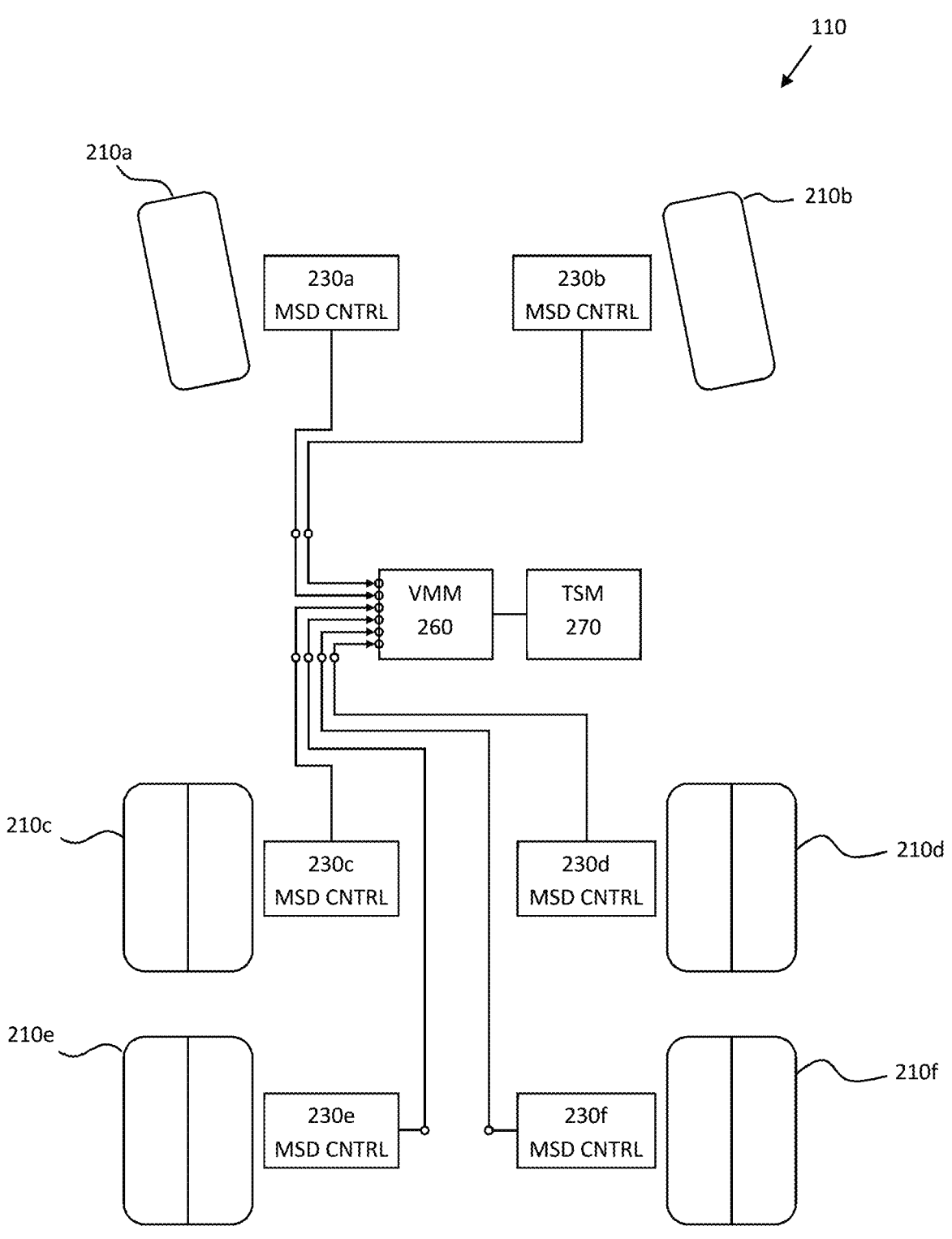
FIG. 6 shows an example motion support device control system.

It is appreciated that the MSD control units discussed herein may also be configured to control one or more MSDs associated with other wheels, in addition to the wheel 210, such as MSDs for controlling wheels of a given axle, or the wheels on one side of a trailer unit, or all wheels of a trailer unit. A system of MSD control units 230a-230f arranged to control respective wheels 210a-210f based on control signals received from a central VMM unit 260 is schematically illustrated in FIG. 6. One or more additional vehicle units, such as one or more trailers 120, possibly connected via dolly vehicle units, can also be controlled in this manner. In this case there may be more than one VMM function, where one VMM function can be assigned a master role and other VMM functions can be configured to operate in slave mode.

To summarize, the VMM function 260 performs force allocation to meet a certain acceleration profile and/or curvature profile. The forces are converted into equivalent wheel slip (or wheel rotational speed) and the slip or speed is sent to the MSD control unit 230 instead of a classical torque request. The conversion from desired force to equivalent slip or wheel rotational speed is performed based on an inverse tyre model $f^{-1}(\ )$. This inverse tyre model is not only a function of the requested wheel torque or wheel force, but also accounts for the current operating scenario in which the vehicle 100 is currently operating. According to an example embodiment, the inverse tyre model used to control the vehicle 100 is given by $$[\omega_{req}, F_{y,rem}, dF_x/d\omega, dF_y/d\omega] = f^{-1}(T_{req}, v_x, v_y, F_{z,act}, R_w, C_{est}, \mu_{est}, F_{y,min}, \alpha_{max})$$

where
$T_{req}$—Torque request at the wheel
$v_x$—Longitudinal speed over ground
$v_y$—Lateral speed over ground
$F_{z,act}$—Normal load on the wheel
$R_w$—Rolling radius of the wheel
$C_{est}$—Estimated tyre stiffness of the wheel (optionally any of lateral $C_{est,y}$ and longitudinal $C_{est,x}$ tyre stiffness)
$\mu_{est}$—Estimated tyre road friction at the wheel
$F_{y,min}$—Minimum required lateral force capacity
$\alpha_{max}$—Maximum allowed lateral slip to achieve $F_{y,min}$
$\omega_{req}$—Wheel rotational speed request, i.e., a target wheel speed to be controlled against
$F_{y,rem}$—Remaining lateral force capacity for given wheel
$dF_x/d\omega$—Gradient of $F_x$ w.r.t to wheel speed at requested tyre operating point
$dF_y/d\omega$—Gradient of $F_y$ w.r.t to wheel speed at requested tyre operating point The tyre stiffness $C_{est}$ may be an estimated tyre stiffness that can be corrected for factors like tyre wear, age, temperature, inflation pressure, etc. This can either be only the longitudinal slip stiffness which can be used as a basis to scale the lateral slip stiffness of a given tyre or a vector comprising both the longitudinal slip stiffness and the lateral slip stiffness of the tyre. Tyre stiffness may have a significant impact on the force to slip curve 400. Without this argument, a nominal stiffness of the tyre can be used in the tyre model.

The estimated friction, $\mu_{est}$ can be used to adapt the tyre force curve 400 to limit the peak force allowed and also to change the peak force slip position in the model. Without this optional input, a nominal dry asphalt tyre force curve can be used.

The minimum required lateral force capacity $F_{y,min}$ and maximum allowed lateral slip angle limit $\alpha_{max}$ are optional constraints to the tyre model which can be communicated via an interface like the interface 265 between the VMM function 260 and the various MSD control units 230. With these additional inputs, the generated longitudinal slip request is limited to a vector space where a lateral force capacity of $F_{y,min}$ is guaranteed using a maximum lateral slip angle of $\alpha_{max}$. Both these optional arguments can be used to request longitudinal force in a safe manner that does not cause significant yaw instability or the like. $F_{y,min}$ can be used to ensure that enough lateral force capacity remains to be able to take a particular corner or complete some other manoeuvre requiring the generation of lateral force (i.e. $F_y$) whereas $\alpha_{max}$ can be used to ensure that the yaw moment balance or the side-slip of the vehicle is maintained within reasonable pre-configured or dynamically determined limits. This feature may be of particular benefit in autonomous or functional safety critical applications where it is desired to keep the tyres operating in their linear combined-slip range (such as the range 410 shown in FIG. 3) and therefore preventing any traction control or yaw stability interventions.

On the output side, $\omega_{req}$ is a wheel speed request and this is the primary request from the tyre model which should result in the required $T_{req}$ as long it is possible to do so given $\mu_{est}$ and without violating the $F_{y,min}$ and $\alpha_{max}$ constraints. It is appreciated that a wheel speed request $\omega_{req}$ can be continuously updated over time in dependence of the speed over ground $v_x$, $v_y$, so as to be equivalent with a wheel slip, e.g., as defined in the wheel slip equation discussed above. Alternatively, a wheel slip value $\lambda_{req}$ can be communicated instead of the wheel speed value. Given wheel speed over ground, wheel slip and wheel speed are equivalent information quantities.

The remaining lateral force capacity $F_{y,rem}$, can be used to adjust bounds on the requests being sent or as feedback to the control allocator to adapt its control requests to increase $F_{y,rem}$, e.g., if it goes too close to zero.

Finally, $dF_x/d\omega$ and $dF_y/d\omega$ represent the gradient of the longitudinal and lateral forces w.r.t the wheel rotational speed $\omega_{tgt}$ at the requested operating point. These parameters can, e.g., be used to custom tune the gains to the speed controller in the actuator depending on the priority of control allocator. For instance, if the vehicle is cornering and the $dF_y/d\omega$ value is high, it indicates that poor speed control performance can degrade the lateral cornering performance and hence the gains for the speed controller can be adapted to prevent this.

Several variations of the function interface above are of course possible. One possibility is to simply remove the rolling radius input and change the torque and rotational speeds $T_{req}$, $R_w$ to force and linear speeds respectively, the inverse tyre model then becomes $$[\omega_{req}, F_{y,rem}, dF_x/d\omega, dF_y/d\omega] = f^{-1}(T_{req}, v_x, v_y, F_{z,act}, C_{est}, \mu_{est}, F_{y,min}, \alpha_{max})$$

Another alternative is to simply send all the tyre parameters as a single structural argument (e.g., $p_{tyre}$) with a predetermined layout. Any values in the fields of the structure can be used to update the existing values whereas default values can be used in place of non-existing fields.

Other options for the outputs of the inverse tyre model can be to send actual or maximum lateral tyre force $F_{y,max}$ or current utilised tyre friction capacity $\mu_{y,util}$ in the y-direction. This would result in model functions according to $$[\omega_{req}, F_{y,act}, dF_x/d\omega, dF_y/d\omega] = f^{-1}(F_{x,req}, v_x, v_y, F_{z,act}, p_{tyre}, F_{y,min}, \alpha_{max})$$

$$[\omega_{req}, F_{y,max}, dF_x/d\omega, dF_y/d\omega] = f^{-1}(F_{x,req}, v_x, v_y, F_{z,act}, p_{tyre}, F_{y,min}, \alpha_{max})$$

$$[\omega_{req}, \mu_{y,util}, dF_x/d\omega, dF_y/d\omega] = f^{-1}(F_{x,req}, v_x, v_y, F_{z,act}, p_{tyre}, F_{y,min}, \alpha_{max})$$

As noted above, many of the inverse tyre model inputs and outputs in the above examples are optional. For instance, default values for the parameters $F_{z,act}, R_w, C_{est}, \mu_{est}, F_{y,min}, \alpha_{max}$ can be used instead of actual measured values. It is also appreciated that the outputs $F_{y,act}, dF_x/d\omega, dF_y/d\omega$ are not necessary for controlling the vehicle on the equivalent wheel speed or wheel slip corresponding to the desired wheel force.

It is also possible to add a steering angle request $\delta_{req}$ to the inverse tyre model, or a steering angle target value to be maintained. In this case the input comprises both required lateral $F_{x,req}$ as well as longitudinal $F_{y,req}$ wheel forces, and the output comprises a target steering angle $\delta_{tgt}$ for a given wheel in addition to the wheel speed or slip, i.e., $$[\omega_{req}, \delta_{req}, dF_x/d\omega, dF_y/d\omega] = f^{-1}(F_{x,req}, F_{y,req}, v_x, v_y, F_{z,act}, p_{tyre}, F_{y,min}, \alpha_{max})$$

It is furthermore appreciated that the wheel rotation speed $\omega_{req}$, i.e., the speed at which a given wheel 210 rotates, can be replaced with wheel slip $\lambda$. This is because wheel speed request $\omega_{req}$ and wheel slip request $\lambda_{req}$ are directly related via wheel radius R given a wheel speed over ground $v_x$. In other words, wheel speed and wheel slip are often equivalent information quantities.

To summarize the discussions above, there is disclosed herein a control unit 130, 140 for controlling a heavy duty vehicle 100. The control unit is arranged to obtain input data indicative of a desired wheel force Fx, Fy to be generated by at least one wheel 210 of the vehicle 100, and to translate the input data into a respective equivalent wheel speed or wheel slip to be maintained by the wheel 210 to generate the desired wheel force Fx, Fy based on an inverse tyre model $f^{-1}$ for the wheel 210. The input data indicative of the desired wheel force to be generated may, for instance, be obtained from a force allocation process where the necessary forces to make the vehicle follow a desired acceleration profile and/or a desired curvature are determined. The acceleration profile and curvature may be obtained from manual control inputs by a driver of the vehicle 100, or from autonomous or semi-autonomous control algorithms running on a VUC. The desired wheel forces may also at least in part be obtained from a remote server 190 via wireless link.

The data indicative of the desired wheel force Fx, Fy may comprise a desired wheel torque Treq and a wheel rolling radius R. By supplying torque and radius, an equivalent desired wheel force may, e.g., be determined as Fx=Treq*R.

The control unit 130, 140 is arranged to obtain the inverse tyre model in dependence of a current operating condition of the wheel 210, and also arranged to control the heavy duty vehicle 100 based on the equivalent wheel speed or wheel slip. This means that the control unit is configured to adapt the inverse tyre mode to the current operating conditions of the vehicle in some way. For instance, if the vehicle is loaded with heavy weight cargo, then the inverse tyre model used to control the vehicle is adjusted to account for the change in operating condition. Various types of operating condition parameters may be considered, as will be discussed in the following. By obtaining the inverse tyre model in dependence of current operating conditions, a more accurate control can be achieved, and also a more robust control. Thus, it is appreciated that the inverse tyre models considered herein are dynamic models which, different from constant models, are adapted to fit the current operating conditions of the heavy duty vehicle. This improves both vehicle performance and safety.

The current operating condition may comprise a vehicle or wheel speed over ground vector with components $v_x$, $v_y$. This vehicle speed over ground can be used to determine a wheel rotational velocity corresponding to a given amount of slip, e.g., by computing the normalized wheel slip difference discussed above. Some tyres also behave a bit differently depending on if the wheel is rotating slowly or faster. Thus, some inverse tyre models may exhibit differences over an operating speed range from, e.g., 0 km/h over ground to say 150 km/h. It is appreciated that wheel control based on requested wheel rotational velocities requires a relatively fast interface between VMM function 260 and the MSD control unit 230. This is because the wheel rotational velocity required to obtain a given wheel slip depends on the velocity over ground, which may change relatively fast over time.

The current operating condition optionally also comprises a normal load Fz or vertical tyre force associated with the wheel 210. The normal load may have a significant effect on the inverse tyre model, i.e., the mapping between desired wheel force and wheel speed or wheel slip. For instance, the maximum available longitudinal tyre force Fx is limited by the normal force and friction coefficient. Thus, by parameterizing the inverse tyre model based on normal load Fz, a more accurate inverse tyre model can be obtained which more closely models the current operating conditions of the vehicle 100.

According to some other aspects, the current operating condition comprises an estimated tyre stiffness Cest of the wheel 210. If the tyre stiffness is explicitly estimated, then a more accurate inverse tyre model can be obtained. The tyre stiffness may, e.g., be estimated based on a feedback system, where measurements of tyre force is mapped against wheel slip, and a linear or semi-linear relationship can be determined. The tyre stiffness can also be obtained, e.g., from a database maintained in the remote server 190 or in a memory connected to the VUC, which can be indexed if the tyre can be identified. Identifying a tyre attached to a given wheel can, e.g., be done by embedding a radio frequency identification (RFID) device into the tyre, or by manual configuration.

The current operating conditions may furthermore comprise an estimated tyre road friction coefficient μ of the wheel. This road friction can be estimated in real time using known methods, such as those disclosed in, e.g., U.S. Pat. Nos. 9,475,500 B2, 8,983,749 B1 or EP 1719676 B1. The inverse tyre model can then be adapted to match the current road friction.

The current operating condition may furthermore comprise a minimum required lateral force capacity Fy,min and/or a maximum allowed lateral slip a of the wheel 210 of the wheel 210. The minimum lateral force capacity Fy,min and maximum lateral slip angle limit α are optional constraints to the tyre model. If this data is taken as input to the inverse tyre model function, then the output can be determined with these parameters as constraints. For instance, it can be ascertained that output wheel speeds or wheel slips are not such as to generate an insufficient lateral force capability, or lateral slip, which is an advantage.

Conversely, the inverse tyre model $f^{-1}$ can also be configured to provide a remaining lateral force capacity Fy,rem of the wheel 210. The remaining lateral force capacity Fy,rem can be used to adjust bounds on the requests being sent or as feedback to the control allocator to adapt its control requests to increase remaining lateral force capacity if it becomes too low.

The inverse tyre model $f^{-1}$ can also be configured to provide a gradient of the desired wheel force dFx, dFy with respect to wheel speed or wheel slip at a tyre operating point associated with the desired wheel force and the current operating condition of the wheel 210. The gradient provides information about the behavior of the model if a small change in input parameters is made, and can be used with advantage to adjust control algorithms in, e.g., the MSD control units 230. For instance, the gradients can be used to adjust a gain of a control function such as a PID controller.

Figure 7:
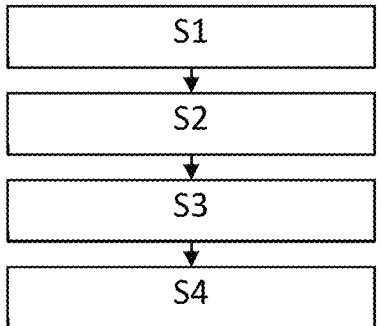
FIG. 7 is a flow chart illustrating a method.

FIG. 7 is a flow chart illustrating methods which summarize at least some of the discussions above. There is illustrated a method performed in a control unit 130, 140 for controlling a heavy duty vehicle 100. The method comprises obtaining S1 input data indicative of a desired wheel force Fx, Fy to be generated by at least one wheel 210 of the vehicle 100, and obtaining S2 an inverse tyre model $f^{-1}$ associated with the wheel 210, wherein the inverse tyre model in dependence of a current operating condition of the wheel 210. The method further comprises translating S3 the input data into a respective equivalent wheel speed or wheel slip to be maintained by the wheel 210 to generate the desired wheel force Fx, Fy based on an inverse tyre model for the wheel 210, and controlling S4 the heavy duty vehicle 100 based on the equivalent wheel speed or wheel slip.

Figure 8:
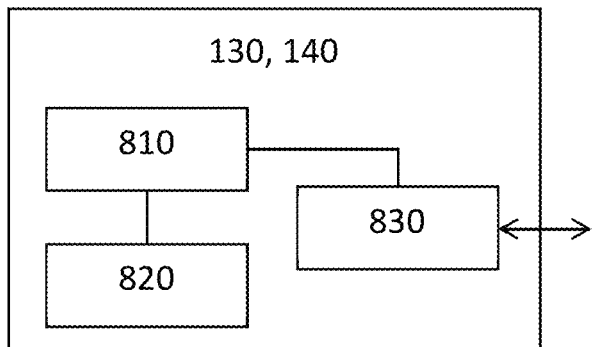
FIG. 8 schematically illustrates a control unit.

FIG. 8 schematically illustrates, in terms of a number of functional units, the components of a control unit such as the VUC 130, 140. The control unit may implement one or more of the above discussed functions of the TSM 270, VMM 260 and/or the MSD control function 230, according to embodiments of the discussions herein. The control unit is configured to execute at least some of the functions discussed above for control of a heavy duty vehicle 100. Processing circuitry 810 is provided using any combination of one or more of a suitable central processing unit CPU, multiprocessor, microcontroller, digital signal processor DSP, etc., capable of executing software instructions stored in a computer program product, e.g. in the form of a storage medium 820. The processing circuitry 810 may further be provided as at least one application specific integrated circuit ASIC, or field programmable gate array FPGA.

Particularly, the processing circuitry 810 is configured to cause the control unit 101 to perform a set of operations, or steps, such as the methods discussed in connection to FIG. 7. For example, the storage medium 820 may store the set of operations, and the processing circuitry 810 may be configured to retrieve the set of operations from the storage medium 820 to cause the control unit 900 to perform the set of operations. The set of operations may be provided as a set of executable instructions. Thus, the processing circuitry 810 is thereby arranged to execute methods as herein disclosed.

The storage medium 820 may also comprise persistent storage, which, for example, can be any single one or combination of magnetic memory, optical memory, solid state memory or even remotely mounted memory.

The control unit 900 may further comprise an interface 830 for communications with at least one external device. As such the interface 830 may comprise one or more transmitters and receivers, comprising analogue and digital components and a suitable number of ports for wireline or wireless communication.

The processing circuitry 810 controls the general operation of the control unit 900, e.g., by sending data and control signals to the interface 830 and the storage medium 820, by receiving data and reports from the interface 830, and by retrieving data and instructions from the storage medium 820. Other components, as well as the related functionality, of the control node are omitted in order not to obscure the concepts presented herein.

Figure 9:
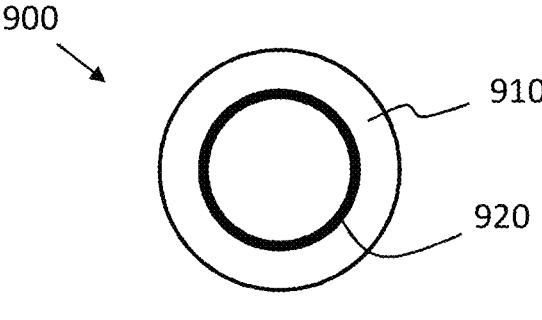
FIG. 9 shows an example computer program product.

FIG. 9 illustrates a computer readable medium 910 carrying a computer program comprising program code means 920 for performing the methods illustrated in FIG. 7, when said program product is run on a computer. The computer readable medium and the code means may together form a computer program product 900.

The invention claimed is:

1. A control unit for controlling a vehicle, wherein the control unit is arranged to obtain input data indicative of a desired wheel force to be generated by at least one wheel of the vehicle, and to translate the input data into a respective equivalent wheel speed or wheel slip to be maintained by the wheel to generate the desired wheel force based on an inverse tire model for the wheel, wherein the equivalent wheel speed or wheel slip corresponds to the desired wheel force such that the equivalent wheel slip is configured to produce the desired wheel force and the equivalent wheel slip is related to a difference between the equivalent wheel speed and a speed over ground, wherein the control unit is arranged to obtain the inverse tire model in dependence of a current operating condition of the wheel, and wherein the control unit is arranged to control the vehicle based on the equivalent wheel speed or wheel slip, and wherein controlling the vehicle based on the equivalent wheel speed or wheel slip comprises sending a request for the equivalent wheel speed or wheel slip to a motion support device controller.

2. The control unit according to claim 1, wherein the control unit is also arranged to allocate a steering angle of one or more steered wheels.

3. The control unit according to claim 1, wherein the data indicative of the desired wheel force comprises a desired wheel torque and a wheel rolling radius.

4. The control unit according to claim 1, wherein the current operating condition comprises a vehicle level force distribution and/or a wheel speed over ground vector.

5. The control unit according to claim 1, wherein the current operating condition comprises a normal load of the wheel.

6. The control unit according to claim 1, wherein the current operating condition comprises an estimated tire stiffness of the wheel.

7. The control unit according to claim 1, wherein the current operating condition comprises a tire road friction coefficient associated with the wheel.

8. The control unit according to claim 1, wherein the current operating condition comprises a minimum required lateral force capacity of the wheel.

9. The control unit according to claim 1, wherein the current operating condition comprises a maximum allowed lateral slip angle of the wheel.

10. The control unit according to claim 1, wherein the inverse tire model is configured to provide a remaining lateral force capacity of the wheel.

11. The control unit according to claim 1, wherein the inverse tire model is configured to provide a gradient of the desired wheel force with respect to wheel speed or wheel slip at a tire operating point associated with the desired wheel force and the current operating condition of the wheel.

12. The control unit according to claim 1, wherein the control unit is arranged to store a pre-determined inverse tire model in memory, wherein the inverse tire model is stored in the memory as a function of the current operating condition of the wheel.

13. The control unit according to claim 1, wherein the control unit is arranged to adapt the inverse tire model based on a measured wheel behavior and/or vehicle behavior in response to the control of the vehicle based on the equivalent wheel speed or wheel slip.

14. The control unit according to claim 13, wherein the inverse tire model is adjusted to always lie within pre-determined upper and/or lower limits on wheel force in dependence of wheel slip or wheel speed.

15. The control unit according to claim 1, wherein the control unit is arranged to represent the inverse tire model as a look-up table.

16. The control unit according to claim 1, wherein the control unit is arranged to represent the inverse tire model as a neural network.

17. The vehicle comprising the control unit according to claim 1.

18. A method performed in a control unit for controlling a vehicle, the method comprising obtaining input data indicative of a desired wheel force to be generated by at least one wheel of the vehicle, obtaining an inverse tire model associated with the wheel, wherein the inverse tire model in dependence of a current operating condition of the wheel, and translating the input data into a respective equivalent wheel speed or wheel slip to be maintained by the wheel to generate the desired wheel force based on an inverse tire model for the wheel, wherein the equivalent wheel speed or wheel slip corresponds to the desired wheel force such that the equivalent wheel slip is configured to produce the desired wheel force and the equivalent wheel slip is related to a difference between the equivalent wheel speed and a speed over ground, and controlling the vehicle based on the equivalent wheel speed or wheel slip, wherein controlling the vehicle based on the equivalent wheel speed or wheel slip comprises sending a request for the equivalent wheel speed or wheel slip to a motion support device controller.

19. A non-transitory computer readable medium carrying a computer program comprising program code for performing the steps of claim 18 when said program code is run on a computer or on processing circuitry of a control unit.

* * * * *